United States Patent
Gharib et al.

(10) Patent No.: US 12,179,289 B2
(45) Date of Patent: Dec. 31, 2024

(54) MULTI-PROCESS WELDING AND CUTTING MACHINE

(71) Applicant: The ESAB Group Inc., Florence, SC (US)

(72) Inventors: Awad Gharib, Columbia, MD (US); Muniswamappa Anjanappa, Ellicott City, MD (US); Arivukkarasu Manavalan, Chennai (IN); Binod Yadav, Kolkata (IN); Xia Chen, Clarksville, MD (US); Lee Roy Mantell, Essex, MD (US)

(73) Assignees: CREATIVE SYSTEMS AND DESIGN, LLC., Ellicott City, MD (US); THE ESAB GROUP INC., Florence, SC (US)

( * ) Notice: Subject to any disclaimer, the term of this patent is extended or adjusted under 35 U.S.C. 154(b) by 545 days.

(21) Appl. No.: 16/437,131

(22) Filed: Jun. 11, 2019

(65) Prior Publication Data

US 2020/0306890 A1 Oct. 1, 2020

(30) Foreign Application Priority Data

Mar. 27, 2019 (IN) .............................. 201941011885

(51) Int. Cl.
*B23K 28/02* (2014.01)
*B23K 9/10* (2006.01)
*B23K 10/00* (2006.01)

(52) U.S. Cl.
CPC ............ *B23K 28/02* (2013.01); *B23K 9/1043* (2013.01); *B23K 10/006* (2013.01)

(58) Field of Classification Search
CPC .... B23K 28/02; B23K 9/1043; B23K 10/006; B23K 9/167; B23K 9/173; B23K 9/00;
(Continued)

(56) References Cited

U.S. PATENT DOCUMENTS 3,530,359 A * 9/1970 Grist .................... B23K 9/1056
219/130.32
4,117,303 A * 9/1978 Hedberg .............. B23K 9/1006
219/130.21
(Continued)

FOREIGN PATENT DOCUMENTS

CN 2194785 Y 4/1995
CN 1187064 A 7/1998
(Continued)

OTHER PUBLICATIONS

International Search Report and Written Opinion for International Patent Application No. PCT/US2020/024414 mailed Jul. 9, 2020, 9 pages.
(Continued)

*Primary Examiner* — Sang Y Paik
*Assistant Examiner* — Bonita Khlok
(74) *Attorney, Agent, or Firm* — Whiteford, Taylor & Preston, LLP; Peter J. Davis (57) ABSTRACT

A welding machine includes a main transformer having first primary winding, a second primary winding, and a secondary winding; a power board configured to receiving mains power and to convert the mains power to converted power to be input to the main transformer; a switch having an input connected to an output of the power board, a first output connected to the first primary winding of the main transformer, and a second output connected to the second primary winding of the main transformer; and a control board configured to control the switch to be arranged in one of (i) a first configuration in which the converted power is supplied, in series, to a first primary winding of a main transformer switching and a second primary winding of the main transformer, and (ii) a second configuration in which the converted power is supplied, in parallel, to the first
(Continued)

primary winding of the main transformer and to the second primary winding of the main transformer.

16 Claims, 8 Drawing Sheets

(58) Field of Classification Search
CPC ...... B23K 10/02; B23K 10/00; B23K 9/0956; B23K 9/1006; B23K 9/1012; H05H 1/26; H05H 1/36; H05H 1/34; H02M 3/33507; H02M 1/0064; H02M 1/007; H02M 1/0077; H02M 5/12; H02M 1/4225; H02M 3/285; H02M 3/158; H01F 30/00
USPC ............ 219/121.39, 121.54, 121.57, 121.36, 219/121.37, 121.38, 121.4–121.46, 219/121.56, 137 PS, 130.1–130.21; 323/355
See application file for complete search history.

(56) References Cited

U.S. PATENT DOCUMENTS

| | | | | |
|---|---|---|---|---|
| 4,410,788 | A * | 10/1983 | Summers | B23K 9/06 219/121.55 |
| 4,453,069 | A * | 6/1984 | Inoue | B23H 1/022 219/69.18 |
| 4,918,285 | A * | 4/1990 | Thommes | B23K 9/1006 219/130.1 |
| 4,943,699 | A * | 7/1990 | Thommes | H05H 1/36 219/121.57 |
| 5,086,205 | A * | 2/1992 | Thommes | B23K 10/00 219/121.54 |
| 5,831,237 | A * | 11/1998 | Daniel | H05H 1/36 219/121.54 |
| 6,023,037 | A | 2/2000 | Church et al. | |
| 6,055,161 | A | 4/2000 | Church et al. | |
| 6,130,398 | A | 10/2000 | Schneider et al. | |
| 6,177,645 | B1 | 1/2001 | Church et al. | |
| 6,313,431 | B1 | 11/2001 | Schneider et al. | |
| 6,388,897 | B1 * | 5/2002 | Ying | H02M 3/33576 363/127 |
| 7,115,834 | B2 | 10/2006 | Sykes et al. | |
| 7,319,206 | B2 | 1/2008 | Thommes | |
| 7,710,748 | B2 * | 5/2010 | Young | H02M 3/3376 363/37 |
| 8,304,685 | B2 | 11/2012 | Bunker et al. | |
| 8,546,728 | B2 | 10/2013 | Sickels | |
| 8,901,450 | B2 | 12/2014 | Manthe et al. | |
| 8,937,266 | B2 | 1/2015 | Feldhausen et al. | |
| 9,132,502 | B2 | 9/2015 | Manthe et al. | |
| 9,333,584 | B2 * | 5/2016 | Dodge | B23K 9/093 |
| 9,431,914 | B2 * | 8/2016 | Freeman | H02M 3/33538 |
| 9,669,484 | B2 | 6/2017 | Holverson et al. | |
| D791,782 | S | 7/2017 | Evans et al. | |
| 9,764,407 | B2 | 9/2017 | Dantinne et al. | |
| 2005/0145611 | A1 * | 7/2005 | Blankenship | H05H 1/36 219/130.1 |
| 2008/0031014 | A1 | 2/2008 | Young | |
| 2008/0149602 | A1 | 6/2008 | Lenzner et al. | |
| 2008/0258703 | A1 * | 10/2008 | Makino | H02J 9/005 323/355 |
| 2009/0152251 | A1 | 6/2009 | Dantinne et al. | |
| 2010/0237053 | A1 | 9/2010 | Dodge | |
| 2012/0241428 | A1 | 9/2012 | Kowaleski | |
| 2014/0374398 | A1 | 12/2014 | Manthe | |
| 2015/0122781 | A1 | 5/2015 | Albrecht | |
| 2015/0144609 | A1 | 5/2015 | Vogel | |
| 2016/0132227 | A1 | 5/2016 | Evans et al. | |
| 2017/0165775 | A1 | 6/2017 | Knoener | |
| 2017/0189987 | A1 | 7/2017 | Sickels | |
| 2017/0259367 | A1 | 9/2017 | Holverson et al. | |
| 2018/0185949 | A1 | 7/2018 | Gharib et al. | |
| 2018/0254696 | A1 | 9/2018 | Machado et al. | |
| 2018/0367049 | A1 | 12/2018 | Mnich | |

FOREIGN PATENT DOCUMENTS

| | | |
|---|---|---|
| CN | 2286440 Y | 7/1998 |
| CN | 1439473 A | 9/2003 |
| CN | 101351952 A | 1/2009 |
| CN | 106374750 A | 2/2017 |
| CN | 106392387 A | 2/2017 |
| EP | 1710897 A2 | 10/2006 |
| GB | 559658 A | 2/1944 |
| HU | 0002601 | 9/2000 |
| JP | H0819872 A | 1/1996 |
| JP | H09150273 A | 6/1997 |
| JP | 2002-263839 A | 9/2002 |
| KR | 200483522 Y1 | 5/2017 |
| WO | 2009078043 A1 | 6/2009 |

OTHER PUBLICATIONS

Examination Report No. 1 for from the Australian Government, IP Australia for Application No. 2020248379 dated Jul. 18, 2022, 4 pages.
Notification of the First Office Action from the China National Intellectual Property Administration for Application No. 202080024787.9 dated Jun. 10, 2022 with English translation, 21 pages.
Notification of Second Office Action from the China National Intellectual Property Administration for Chinese Patent Application No. 202080024787.9 with English translation dated Feb. 23, 2023, 21 pages.
Extended European Search Report for European Application No. 20777217.9 dated Dec. 12, 2022, 8 pages.
Notification of Third Office Action from the China National Intellectual Property Administration for Chinese Patent Application No. 202080024787.9 with English translation dated Aug. 26, 2023, 17 pages.
Rejection Decision from the China National Intellectual Property Administration for Chinese Patent Application No. 202080024787.9 with English translation dated Jan. 19, 2024, 30 pages.
Yang Weiguo et al., Power Electronics Technology, Oct. 2011, pp. 82-84, Metallurgical Industry Press with English translation, 8 pages.

* cited by examiner

MULTI-PROCESS WELDING AND CUTTING MACHINE

This application claims the benefit of Indian Provisional Application No. 201941011885, filed Mar. 27, 2019, the subject matter of which is incorporated herein by reference.

FIELD OF THE DISCLOSURE

The present disclosure relates generally to welding and cutting equipment and, more particularly, to a multi-process machine configured to support both cutting and welding processes in a single machine.

BACKGROUND OF THE DISCLOSURE

Portable welding and cutting systems are known, and often incorporate a power supply and related mechanisms (e.g., wire feeder, wire spool) in a portable case. Such portable welding systems find use in applications where it is not practical or convenient to send a work-piece to a shop for repair or fabrication. Examples of applications for such portable welding systems include petroleum and chemical equipment fabrication, shipboard installation and repair, and the like. As such, known portable welding systems may be relatively lightweight to enable a user to lift and carry the system to a work site. Because of the portability and flexibility of these welding systems they have found widespread use and popularity.

There are many welding and cutting processes or techniques that are now available to a technician including stick welding, tungsten inert gas (TIG) welding, and metal inert gas (MIG) welding (which may also rely on a wire feeder mechanism), plasma cutting and gouging, among other welding and cutting techniques. Each of these processes and techniques has its set of advantages and disadvantages, and, as such, certain processes and techniques may be more suitable, convenient, efficient, or beneficial for a given job and type of material being welded or cut. To make such multiple processes more easily/readily available, multi-process welding machines have been designed and marketed. However, providing a single machine that can support each of these techniques in an efficient, economical and intuitive manner, and a single machine that is truly portable, can be challenging.

SUMMARY OF THE DISCLOSURE

A welding machine includes a main transformer having first primary winding, a second primary winding, and a secondary winding; a power board configured to receive mains power and to convert the mains power to converted power to be input to the main transformer; a switch having an input connected to an output of the power board and outputs connected to the first primary winding of the main transformer and to the second primary winding of the main transformer; and a control board configured to control the switch to be arranged in one of (i) a first configuration in which the converted power is supplied to the first primary winding only of the main transformer to generate cutting power and (ii) a second configuration in which the converted power is supplied to the first primary winding and the second primary winding of the main transformer to generate welding power. In another embodiment, the switch is configured to place the first primary winding and the second primary winding in parallel with one another for cutting power, or in series with one another for welding. In addition, when operating in a cutting or gouging mode, an additional output inductance is switched into an output circuit of the welding machine.

BRIEF DESCRIPTION OF THE DRAWINGS

By way of example, embodiments of the disclosed systems and methods will now be described, with reference to the accompanying drawings, in which.

DETAILED DESCRIPTION

Generally, the output of a machine for welding provides relatively high current and relatively low voltage. On the other hand, the output of a machine for cutting or gouging (e.g., plasma cutting or gouging, referred to herein after, collectively as "cutting") provides relatively low current and relatively high voltage. The nature of the output of a machine for welding or cutting is dictated by an output section of the machine. Such an output section typically comprises, at a high level, a main transformer and an output diode. To implement a single multi-process machine capable of providing appropriate power for both welding and cutting, the described embodiments provide a main transformer and an output diode (or diodes) that are capable of handling high and low current, and high and low voltage, as needed, for either the welding process or the cutting process.

Figure 1:
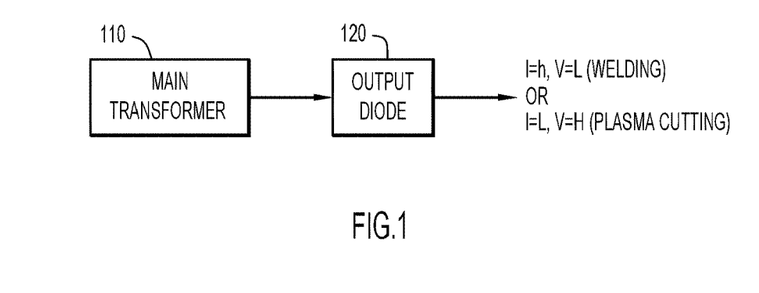
FIG. 1 depicts a block diagram of an output section of a multi-process welding and cutting machine that employs a single main transformer and a single output diode in accordance with an example embodiment.

FIG. 1 depicts a block diagram of an output section of a multi-process welding and cutting machine that employs a single main transformer and a single output diode in accordance with an example embodiment. That is, a single main transformer 110 supplies output power to output diode 120. As will be explained later with reference to FIGS. 5, 6A and 6B, the windings of the main transformer 110 can be configured to cause main transformer 110 to deliver, on the one hand, relatively high current and low voltage for welding and, on the other hand, relatively low current and high voltage for (plasma) cutting (and/or gouging). In the embodiment of FIG. 1, diode 120 is capable of handling the broad range of current and voltage for either welding or cutting. Diode 120 may be a single diode or may be a module that comprises multiple diodes.

Figure 2:
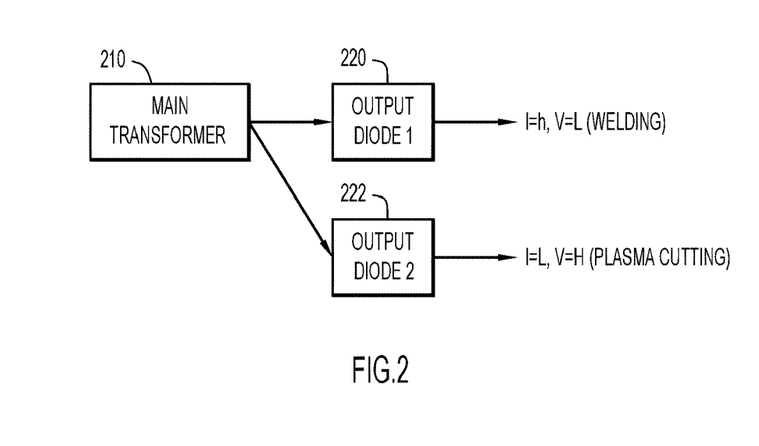
FIG. 2 depicts a block diagram of an output section of a multi-process welding and cutting machine that employs a single main transformer and two output diodes in accordance with an example embodiment.

FIG. 2 depicts a block diagram of an output section of a multi-process welding and cutting machine that employs a single main transformer and two output diodes in accordance with an example embodiment. That is, a single main transformer 210 supplies output power to a first output diode 220 or to a second output diode 222. As will be explained later with reference to FIG. 7, separate windings may be provided on main transformer 210 to cause main transformer 210 to deliver, on the one hand, relatively high current and low voltage for welding and, on the other hand, relatively low current and high voltage for (plasma) cutting (and/or gouging). The welding power is supplied to and passed via output diode 220, whereas the cutting power is supplied to and passed via output diode 222. Output didoes 220, 222 may be single diodes or may comprise modules that comprise multiple diodes, respectively.

Figure 3:
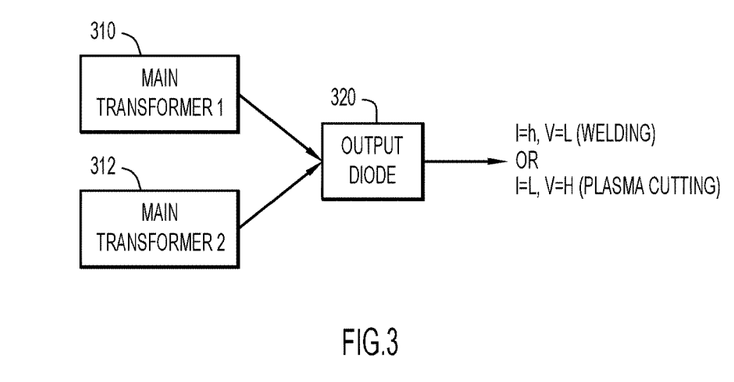
FIG. 3 depicts a block diagram of an output section of a multi-process welding and cutting machine that employs two main transformers and a single output diode in accordance with an example embodiment.

FIG. 3 depicts a block diagram of an output section of a multi-process welding and cutting machine that employs two main transformers and a single output diode in accordance with an example embodiment. That is, a first main transformer 310 and a second main transformer 312 are configured to separately supply output power to output diode 320. As will be explained later with reference to FIG. 8, the two main transformers are configured, respectively, to deliver, on the one hand, relatively high current and low voltage for welding and, on the other hand, relatively low current and high voltage for cutting. The welding power and the cutting power is supplied to output diode 320. Diode 320 may be a single diode or may be a module that comprises multiple diodes.

Figure 4:
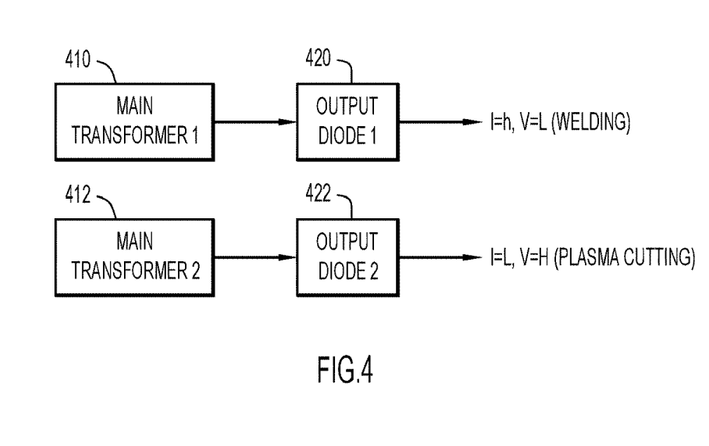
FIG. 4 depicts a block diagram of an output section of a multi-process welding and cutting machine that employs two main transformers and two output diodes in accordance with an example embodiment.

FIG. 4 depicts a block diagram of an output section of a multi-process welding and cutting machine that employs two main transformers and two output diodes in accordance with an example embodiment. That is, a first main transformer 410 and a second main transformer 412 are configured to separately, and respectively, supply output power to a first output diode 420 and a second output diode 422. As will be explained later with reference to FIG. 9, the two main transformers are respectively configured to deliver, on the one hand, relatively high current and low voltage for welding and, on the other hand, relatively low current and high voltage for cutting. The welding power and the cutting power is respectively supplied to output diode 420 and output diode 422. Output didoes 420, 422 may be single diodes or comprises multiple diodes, respectively.

In general, welding power requires 10-40V DC, while cutting power requires 100-400V DC. Both of these voltage value ranges (and associated currents) can be provided by the embodiments described herein.

Figure 5:
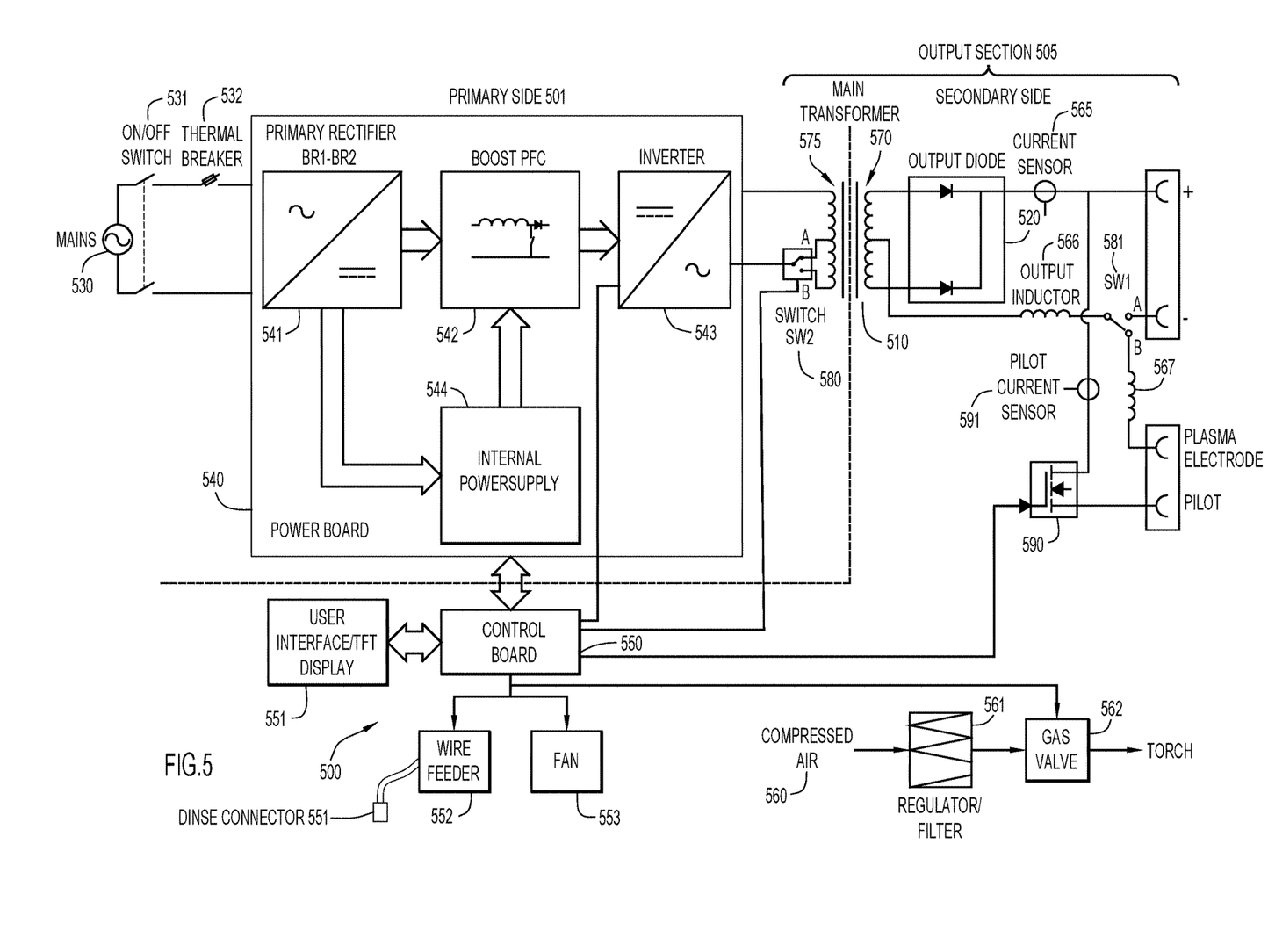
FIGS. 5 and 6A depict, respectively, first and second embodiments of implementations of a multi-process welding and cutting machine that employs a single main transformer and a single output diode in accordance with an example embodiment.

FIG. 5 depicts a first embodiment of an implementations of a multi-process welding and cutting machine that employs a single main transformer and a single output diode in accordance with an example embodiment. As shown, the machine 500 includes a primary side 501 and a secondary side 502 separated by main transformer 510. In this case, an output section 505 includes the main transformer 510 and output diode 520, among other components.

Mains power 530 is applied to a power board 540 via on/off switch 531 and thermal breaker 532. The mains power passes through primary rectifier 541, boost power factor controller (PFC) 542 and primary inverter 543. An internal power supply 544 may be supplied power from an output of primary rectifier. A control board 550, which may receive input via a user interface 551 (such as a thin film transistor display panel with associated input controls), provides, e.g., pulse wave modulation (PWM) signals to primary inverter 543 to control the frequency of the output of primary inverter 543, and may further provide control signals to a wire feeder 552, a fan 553, a gas valve 562 (which supplies compressed air and/or gas through regulator/filter 561), and a pilot control switch 590 that enables pilot power to reach a torch. An output side of the output diode 520 may be monitored via a current sensor 565 and pilot current may be monitored via pilot current sensor 591 (with monitored values provided to control board 550). An output inductor 566 may be connected to, e.g., a center tap of the secondary winding 570 of the main transformer 510.

A switch 580 (SW2) may also be controlled by control board 550 to cause a number of turns on a primary winding 575 of main transformer 510 to increase or decrease to control the turns ratio of the main transformer 510 (given a predetermined number of turns on the secondary side 570 of the main transformer 510), and thus provide a desired power composition (e.g., low voltage, high current; or high voltage, low current) depending on whether a welding or cutting process has been selected by a user via the user interface 551. Specifically, switch 580 (SW2) can be in a position A or B. In position A, fewer turns are included for primary winding 575, and in position B more turns are included for primary winding 575. Switch 581 (SW1) is also provided and is configured to be in one of two positions to, in position B, include additional inductance 567 employed when the machine 500 is in cutting or gouging mode, or, in position A, to remove that additional inductance. A Dinse connector 551, may be provided to energize the wire feeder 552.

The table below indicates how, in operation, switches 580, 581 are configured and to what elements the output terminals of the machine 500 are connected.

| Mode of Operation | Positive Machine Terminal (+) | Negative Machine Terminal (−) | Switch Position SW1 | Switch Position SW2 |
|---|---|---|---|---|
| MIG Weld | Wire Feeder Dinse | Work Piece Clamp | A | B |
| Stick Weld | Stick Electrode holder | Work Piece Clamp | A | B |
| TIG Weld | Work Piece Clamp | TIG Torch | A | B |
| Plasma Cut | Work Piece Clamp | — | B | A |

Figure 6A:
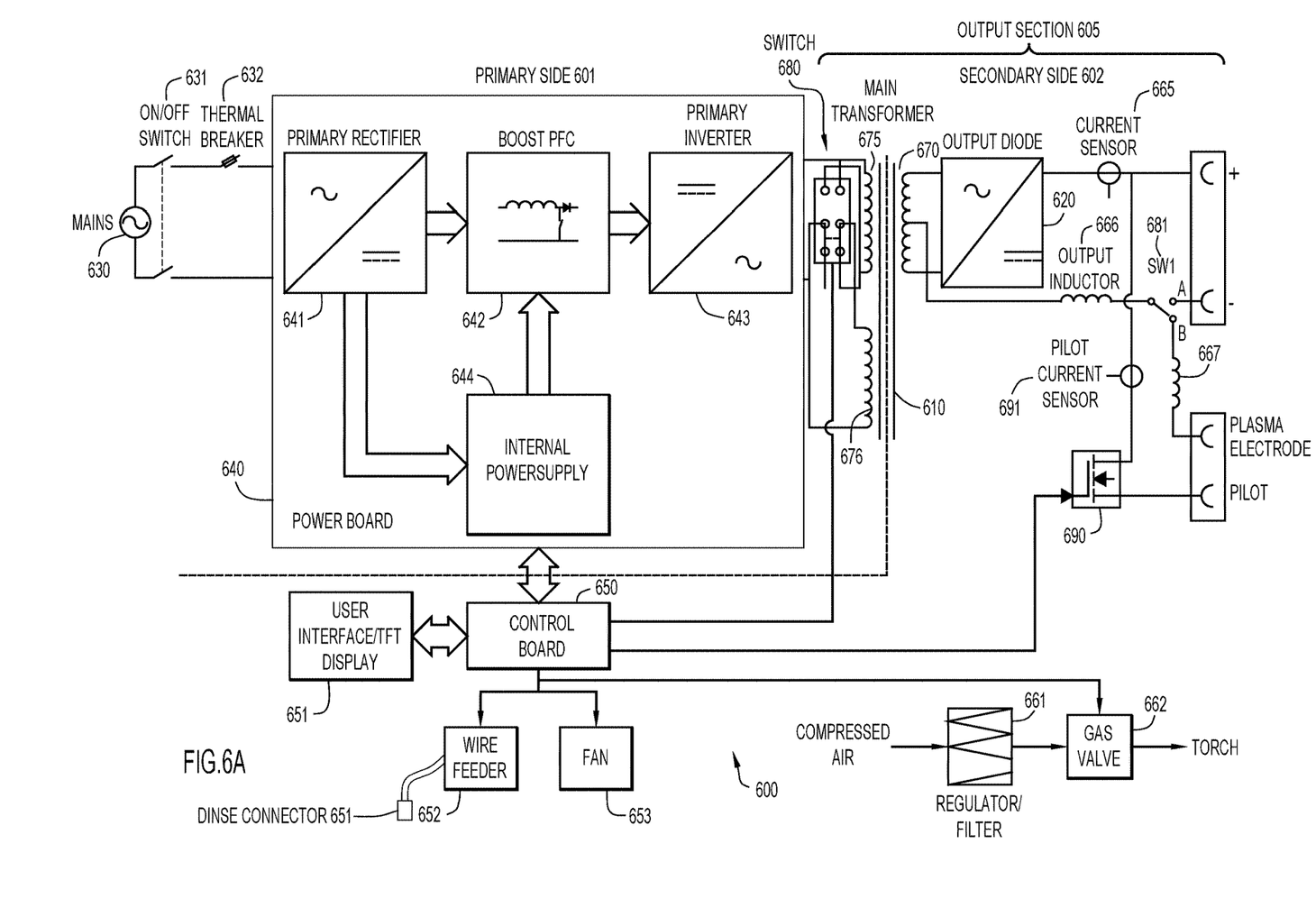

FIG. 6A depicts a second embodiment of an implementation of a multi-process welding and cutting machine that employs a single main transformer and a single output diode in accordance with an example embodiment. As shown, the machine 600 includes a primary side 601 and a secondary side 602 separated by main transformer 610. In this case, an output section 605 includes the main transformer 610 and output diode 620, among other components.

Mains power 630 is applied to a power board 640 via on/off switch 631 and thermal breaker 632. The mains power passes through primary rectifier 641, boost power factor controller (PFC) 642 and primary inverter 643. An internal power supply 644 may be supplied power from an output of primary rectifier 641. A control board 650, which may receive input via a user interface 651 (such as a thin film transistor display panel with associated input controls), provides, e.g., pulse wave modulation (PWM) signals to primary inverter 643 to control the frequency of the output of primary inverter 643, and may further provide control signals to a wire feeder 652, a fan 653, a gas valve 662 (which supplies compressed air and/or gas through regulator/filter 661), and a pilot control switch 690 that enables pilot power to reach a torch. An output side of the output diode 620 may be monitored via a current sensor 665 and pilot current may be monitored via pilot current sensor 691 (with monitored values provided to control board 650). An output inductor 666 may be connected to, e.g., a center tap of a secondary winding 670 of the main transformer 610.

A switch 680 may also be controlled by control board 650 to cause a first primary winding 675 and a second primary winding 676 to be arranged in series or in parallel with each other to control the turns ratio of the main transformer 610 (given a predetermined number of turns on the secondary side 670 of the main transformer 610), and thus provide a desired power composition (e.g., low voltage, high current; or high voltage, low current) depending on whether a welding or cutting process has been selected by a user via the user interface 651. A switch 681 (SW1) is also provided and is configured to be in one of two positions to, in position B, include additional inductance 667 employed when the machine 600 is in cutting or gouging mode, or, in position A, to remove that additional inductance. A Dinse connector 651 may be provided to energize the wire feeder 652.

The table below indicates how, in operation, switch 680 and 681 (SW1) are configured and to what elements the output terminals of the machine 600 are connected.

| Mode of Operation | Positive Machine Terminal (+) | Negative Machine Terminal (−) | Switch Position SW1 | Switch Position SW2 |
|---|---|---|---|---|
| MIG Weld | Wire Feeder Dinse | Work Piece Clamp | A | Series |
| Stick Weld | Stick Electrode holder | Work Piece Clamp | A | Series |
| TIG Weld | Work Piece Clamp | TIG Torch | A | Series |
| Plasma Cut | Work Piece Clamp | — | B | Parallel |

Figure 6B:
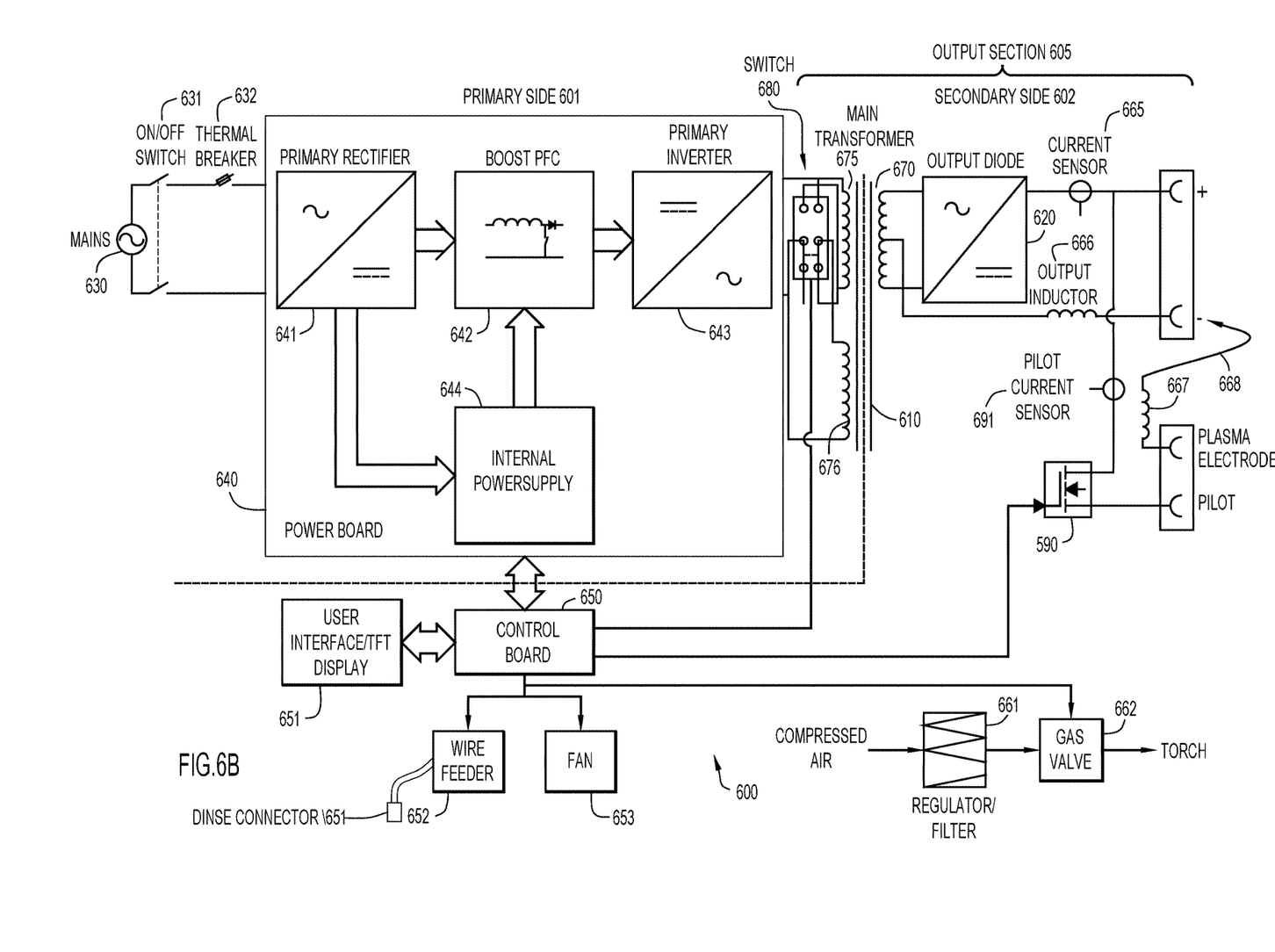
FIG. 6B depicts another embodiment of a multi-process welding and cutting machine that employs a single main transformer and a single output diode in accordance with an example embodiment.

FIG. 6B is similar to FIG. 6A, but instead of including switch 681 (SW1) to switch in or out inductance 667, FIG. 6B employs another external Dinse connector 668, for example, to connect the additional inductance 667 to the output inductor 666. It is noted that in any of the embodiments described herein where SW1 is shown, such a switch could be eliminated in favor of an external connection like that shown in FIG. 6B.

Figure 7:
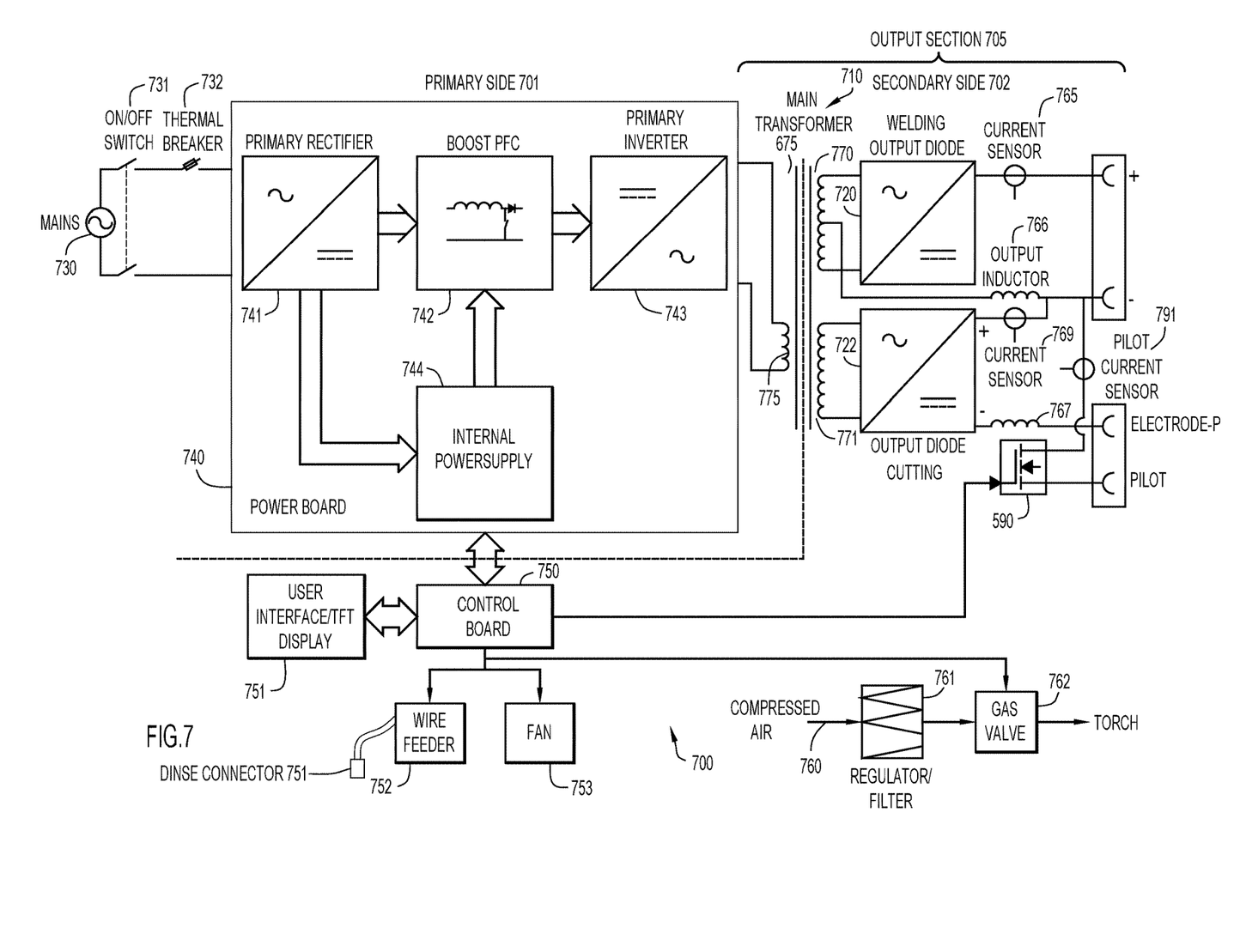
FIG. 7 depicts an embodiment of an implementation of a multi-process welding and cutting machine that employs a single main transformer and two output diodes in accordance with an example embodiment.

FIG. 7 depicts an embodiment of an implementation of a multi-process welding and cutting machine that employs a single main transformer and two output diodes in accordance with an example embodiment. As shown, the machine 700 includes a primary side 701 and a secondary side 702 separated by a main transformer 710. In this case, an output section 705 includes the main transformer 710, a first output diode 720 and a second output diode 722, among other components.

Mains power 730 is applied to a power board 740 via on/off switch 731 and thermal breaker 732. The mains power passes through primary rectifier 741, boost power factor controller (PFC) 742 and primary inverter 743. An internal power supply 744 may be supplied power from an output of primary rectifier 741. A control board 750, which may receive input via a user interface 751 (such as a thin film transistor display panel with associated input controls), provides, e.g., pulse wave modulation (PWM) signals to primary inverter 743 to control the frequency of the output of primary inverter 743, and may further provide control signals to a wire feeder 752, a fan 753, a gas valve 762 (which supplies compressed air and/or gas through regulator/filter 761), and a pilot control switch 790 that enables pilot power to reach a torch. An output side of the first output diode 720 may be monitored via a current sensor 765, an output side of the second output diode 722 may be monitored by a current sensor 769, and pilot current may be monitored via pilot current sensor 791 (with monitored values provided to control board 750). Output inductor 766 may be connected to, e.g., a center tap of a secondary winding 770 of the main transformer 710 and an output of second output diode 722.

In the case of machine 700, two secondary windings 770, 771 supply power to respective output diodes 720, 722. The secondary winding 770 and output diode 720 may be optimized for welding power (i.e., low voltage and high current). The secondary winding 771 and output diode 722 may be optimized for cutting power (i.e., high voltage and low current). An additional inductance 767 may be provided and connected to an output of output diode 722 (for plasma cutting). A Dinse connector 751, may be provided to energize the wire feeder 752.

The table below indicates how, in operation, to what elements the output terminals of the machine 700 are connected.

| Mode of Operation | Positive Machine Terminal (+) | Negative Machine Terminal (−) |
|---|---|---|
| MIG Weld | Wire Feeder Dinse | Work Piece Clamp |
| Stick Weld | Stick Electrode holder | Work Piece Clamp |
| TIG Weld | Work Piece Clamp | TIG Torch |
| Plasma Cut | — | Work Piece Clamp |

Figure 8:
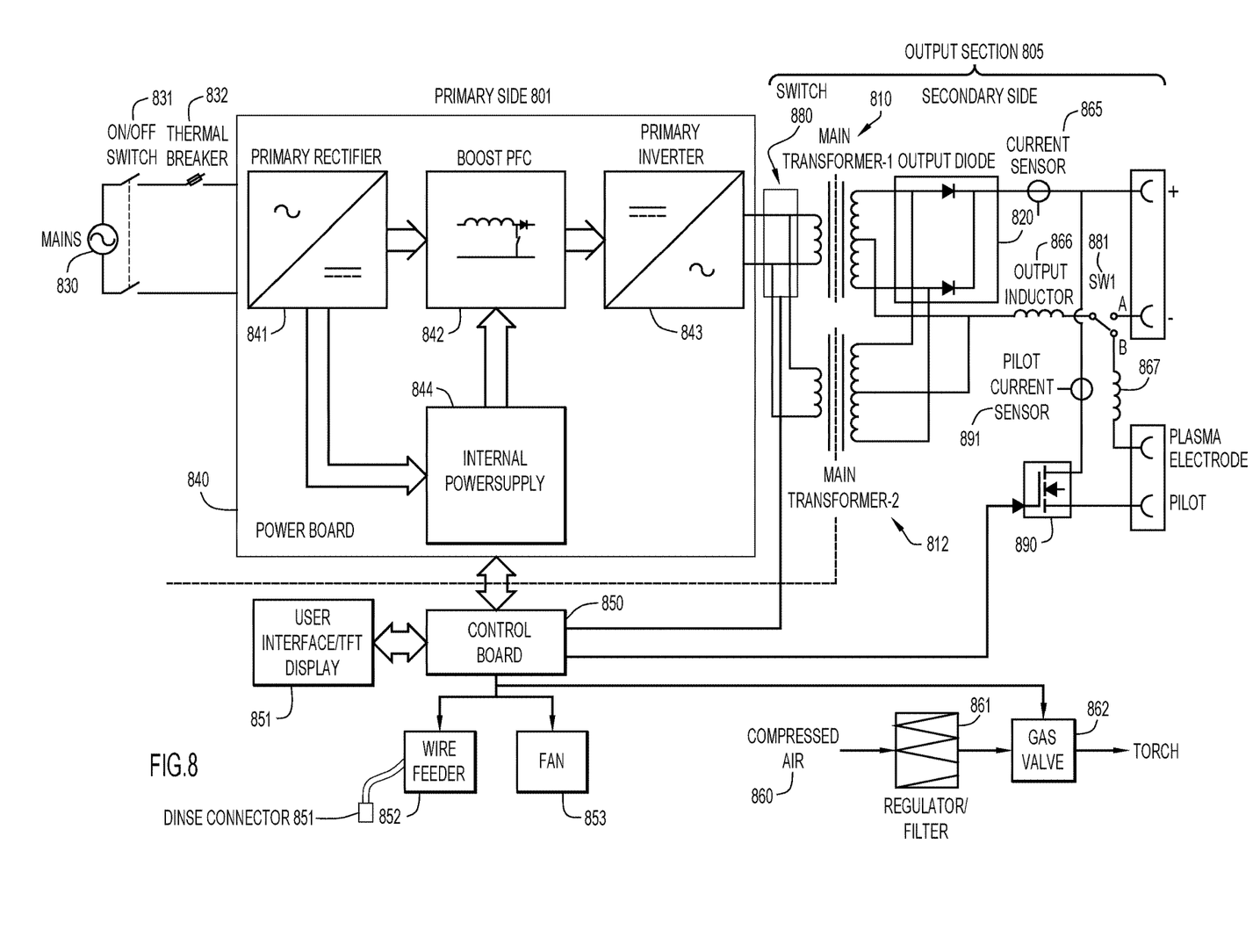
FIG. 8 depicts an embodiment of an implementation of a multi-process welding and cutting machine that employs two main transformers and a single output diodes in accordance with an example embodiment.

FIG. 8 depicts an embodiment of an implementation of a multi-process welding and cutting machine that employs two main transformers and a single output diode in accordance with an example embodiment. As shown, the machine 800 includes a primary side 801 and a secondary side 802 separated by a first main transformer 810 and a second main transformer 812. In this case, an output section 805 includes the main transformers 810, 812, and output diode 820, among other components.

Mains power 830 is applied to a power board 840 via on/off switch 831 and thermal breaker 832. The mains power passes through primary rectifier 841, boost power factor controller (PFC) 842 and primary inverter 843. An internal power supply 844 may be supplied power from an output of primary rectifier 841. A control board 850, which may receive input via a user interface 851 (such as a thin film transistor display panel with associated input controls), provides, e.g., pulse wave modulation (PWM) signals to primary inverter 843 to control the frequency of the output of primary inverter 843, and may further provide control signals to a wire feeder 852, a fan 853, a gas valve 862 (which supplies compressed air and/or gas through regulator/filter 761), and a pilot control switch 890 that enables pilot power to reach a torch. An output side of the output diode 820 may be monitored via a current sensor 865, and pilot current may be monitored via pilot current sensor 891 (with monitored values provided to control board 850). Output inductor 866 may be connected to, e.g., a center tap of a secondary winding of each of the main transformers 810, 812.

A switch 880 may also be controlled by control board 850 to select between the first main transformer 810 and the second main transformer 812 to control the nature of the power being supplied to output diode 820, and thus provide a desired power (e.g., low voltage, high current; or high voltage, low current) depending on whether a welding or cutting process has been selected by a user via the user interface 851.

Switch 881 (SW1) is also provided and is configured to be in one of two positions to, in position B, include additional inductance 867 employed when the machine 800 is in cutting or gouging mode, or, in position A, to remove that additional inductance. A Dinse connector 851, may be provided to energize the wire feeder 852.

The table below indicates how, in operation, switches 880, 881 are configured and to what elements the output terminals of the machine 800 are connected.

| Mode of Operation | Positive Machine Terminal (+) | Negative Machine Terminal (−) | Switch Position SW1 | Main Transformer Selected via switch 880 |
|---|---|---|---|---|
| MIG Weld | Wire Feeder Dinse | Work Piece Clamp | A | Main Transformer-1 810 |
| Stick Weld | Stick Electrode holder | Work Piece Clamp | A | Main Transformer-1 810 |
| TIG Weld | Work Piece Clamp | TIG Torch | A | Main Transformer-1 810 |
| Plasma Cut | Work Piece Clamp | — | B | Main Transformer-2 812 |

Figure 9:
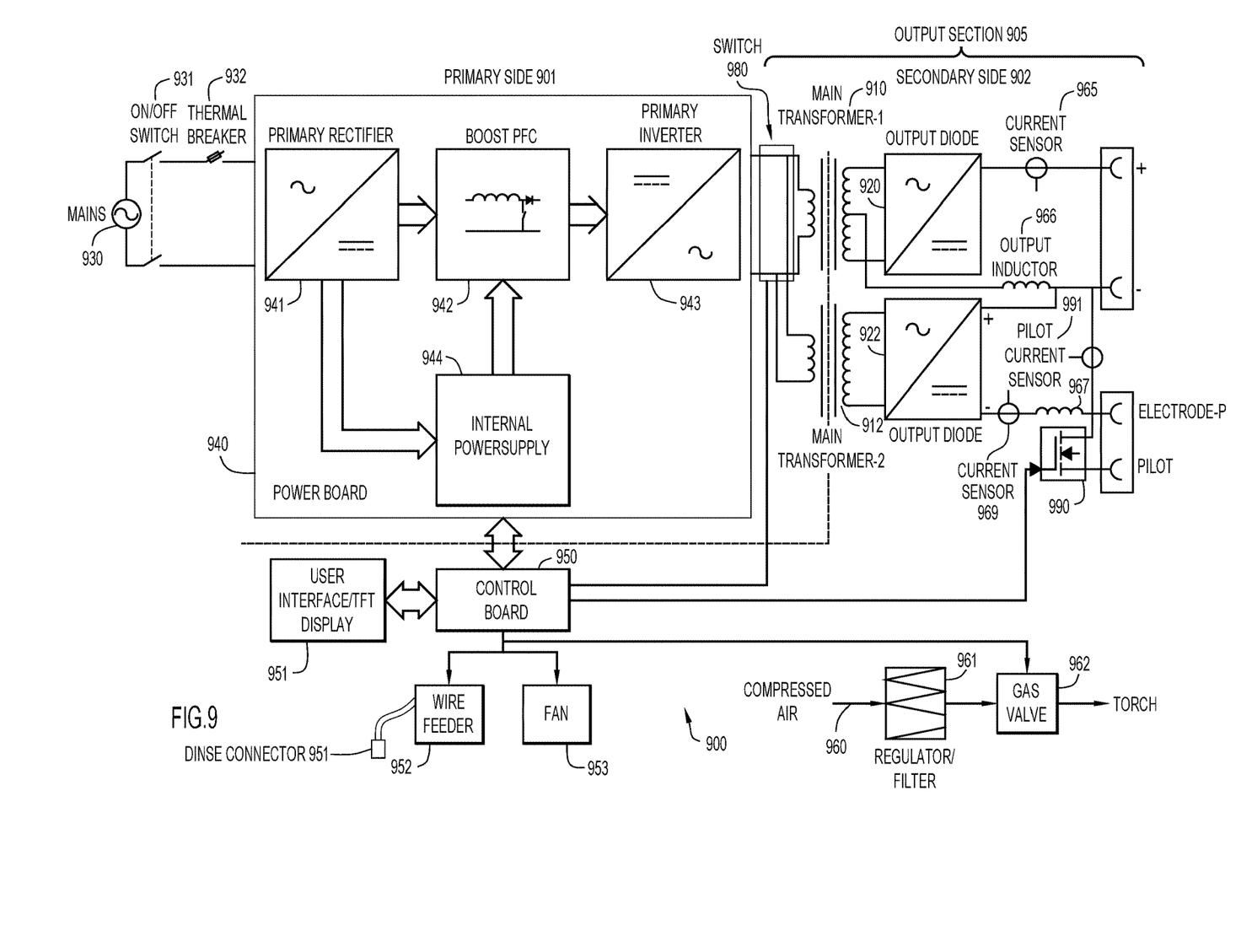
FIG. 9 depicts an embodiment of an implementation of a multi-process welding and cutting machine that employs two main transformers and two output diodes in accordance with an example embodiment.

FIG. 9 depicts an embodiment of an implementation of a multi-process welding and cutting machine that employs two main transformers and two output diodes in accordance with an example embodiment. As shown, the machine 900 includes a primary side 901 and a secondary side 902 separated by a first main transformer 910 and a second main transformer 912. In this case, an output section 905 includes, among other components, the main transformers 910, 912, and a first output diode 920 and a second output diode 922 connected respectively to the main transformers 910, 912.

Mains power 930 is applied to a power board 940 via on/off switch 931 and thermal breaker 932. The mains power passes through primary rectifier 941, boost power factor controller (PFC) 942 and primary inverter 943. An internal power supply 944 may be supplied power from an output of primary rectifier 941. A control board 950, which may receive input via a user interface 951 (such as a thin film transistor display panel with associated input controls), provides, e.g., pulse wave modulation (PWM) signals to primary inverter 943 to control the frequency of the output of primary inverter 943, and may further provide control signals to a wire feeder 952, a fan 953, a gas valve 962 (which supplies compressed air and/or gas through regulator/filter 961), and a pilot control switch 990 that enables pilot power to reach a torch. An output side of output diode 920 may be monitored via a current sensor 965, an output side of output diode 922 may be monitored via a current sensor 969, and pilot current may be monitored via pilot current sensor 991 (with monitored values provided to control board 950). Output inductor 966 may be connected to, e.g., a center tap of a secondary winding the first main transformer 910.

A switch 980 may also be controlled by control board 950 to select between the first main transformer 910 and the second main transformer 912 to control the nature of the power being supplied to either output diode 920 or output diode 922, and thus provide a desired power (e.g., low voltage, high current; or high voltage, low current) depending on whether a welding or cutting process has been selected by a user via the user interface 951. An additional inductance 967 may be employed when the machine 800 is in cutting or gouging mode. A Dinse connector 951, may be provided to energize the wire feeder 952.

The table below indicates how, in operation, switches 880 is configured and to what elements the output terminals of the machine 800 are connected.

| Mode of Operation | Positive Machine Terminal (+) | Negative Machine Terminal (−) | Main Transformer Selected via switch 980 |
|---|---|---|---|
| MIG Weld | Wire Feeder Dinse | Work Piece Clamp | Main Transformer-1 910 |
| Stick Weld | Stick Electrode holder | Work Piece Clamp | Main Transformer-1 910 |
| TIG Weld | Work Piece Clamp | TIG Torch | Main Transformer-1 910 |
| Plasma Cut | — | Work Piece Clamp | Main Transformer-2 912 |

Figure 10:
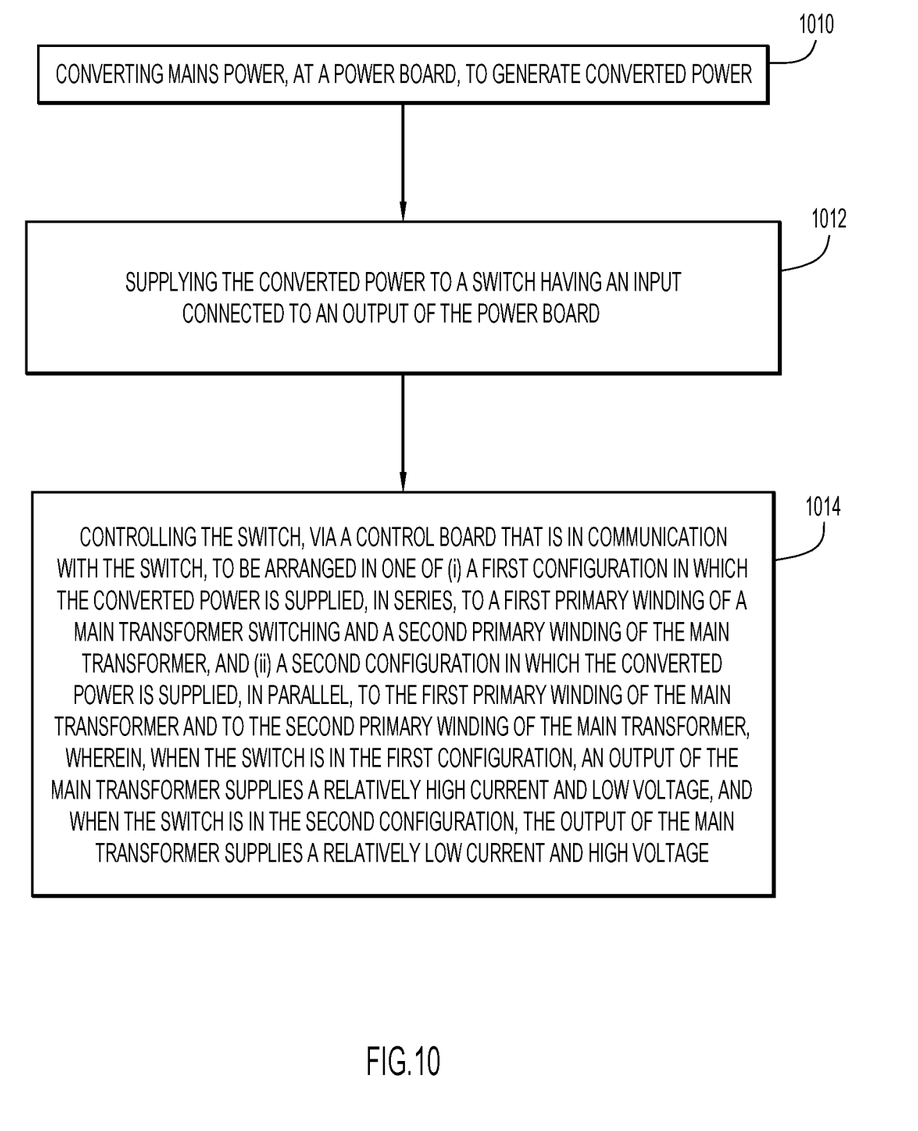
FIG. 10 is a flow chart depicting a series of operations for operating a multi-process welding or cutting machine in accordance with an example embodiment.

FIG. 10 is a flow chart depicting a series of operations for operating a multi-process welding or cutting machine in accordance with an example embodiment. At 1010, the machine converts mains power, at a power board, to generate converted power. At 1012, the machine supplies the converted power to a switch having an input connected to an output of the power board At 1014, the machine controls the switch, via a control board that is in communication with the switch, to be arranged in one of (i) a first configuration in which the converted power is supplied, in series, to a first primary winding of a main transformer switching and a second primary winding of the main transformer, and (ii) a second configuration in which the converted power is supplied, in parallel, to the first primary winding of the main transformer and to the second primary winding of the main transformer, wherein, when the switch is in the first configuration, an output of the main transformer supplies a relatively high current and low voltage, and when the switch is in the second configuration, the output of the main transformer supplies a relatively low current and high voltage.

Operation 1014 can also be configured to control the switch such that the first primary winding and second primary winding are placed in series in the first configuration, and the second primary winding is removed from the circuit in the second configuration.

The above description is intended by way of example only. Various modifications and structural changes may be made therein without departing from the scope of the concepts described herein and within the scope and range of equivalents of the claims.

What is claimed is:

1. A welding system, comprising:
    a main transformer having a first primary winding, a second primary winding separate from the first primary winding, and a secondary winding;
    an output diode connected to the secondary winding of the main transformer;
    a power board configured to receive mains power and to convert, with an inverter, the mains power to converted power to be input to the main transformer;
    a first switch having an input connected to an output of the power board and configured to pass the converted power to the main transformer, wherein the converted power is alternating current power, and the input of the first switch receives the alternating current power from the inverter;
    an output inductor having a first terminal and a second terminal, wherein the first terminal is connected to a center tap of the secondary winding;
    a second switch connected to the second terminal of the output inductor;
    a pilot control switch configured to enable a pilot arc to be energized from an output of the output diode; and
    a control board, in communication with the first switch, and the pilot control switch, and configured to control the first switch to be arranged in one of a first configuration and a second configuration,
    wherein when the first switch is in the first configuration, an output of the main transformer supplies a relatively high current and low voltage through the output diode, and when the first switch is in the second configuration, the output of the main transformer supplies a relatively low current and high voltage through the output diode, and when the first switch is arranged, by the control board, in the second configuration, the second switch is placed in a state that causes an additional output inductance to be connected in series with the output inductor, which is connected to the center tap of the secondary winding, and
    the output of output diode supplies the relatively high current and low voltage, and the relatively low current and high voltage based on a selected welding or cutting process.

2. The welding machine of claim 1, wherein the relatively high current and low voltage is suitable for the welding process.

3. The welding machine of claim 1, wherein the relatively low current and high voltage is suitable for the cutting process.

4. The welding machine of claim 3, wherein the cutting process is a plasma cutting process.

5. The welding machine of claim 1, wherein the output diode comprises a single output diode module.

6. The welding machine of claim 5, wherein the output of the main transformer passes through the single output diode module.

7. The welding machine of claim 1, further including a user interface in communication with the control board and configured to allow a user to select the welding process or the cutting process.

8. The welding machine of claim 7, wherein the control board is configured, in response to a selection of the welding process or the cutting process, to configure the first switch to be in the first configuration or the second configuration, respectively.

9. A method of operating a welding machine, comprising:
    converting, using an inverter, mains power, at a power board, to generate alternating current converted power;
    supplying the alternating current converted power to a first switch via an input connected to an output of the power board;
    controlling the first switch, via a control board that is in communication with the first switch, to be arranged in one of (i) a first configuration in which the alternating current converted power is supplied, in series, to a first primary winding of a main transformer and a second primary winding of the main transformer, and (ii) a second configuration in which the alternating current converted power is supplied, in parallel, to the first primary winding of the main transformer and to the second primary winding of the main transformer,
    wherein, when the first switch is in the first configuration, an output of the main transformer supplies via a secondary winding, through an output diode, a relatively high current and low voltage, and when the first switch is in the second configuration, the output of the main transformer supplies, through the output diode, a relatively low current and high voltage, and
    when the first switch is in the second configuration, a second switch is placed in a state that causes an additional output inductance to be connected in series with an output inductor that is connected to a center tap of the secondary winding, a pilot control switch is controlled to enable a pilot arc to be energized from an output of the output diode, and the output of the output diode supplies each of the relatively high current and low voltage, and the relatively low current and high voltage based on a selected welding or cutting process.

10. The method of claim 9, wherein the relatively high current and low voltage is suitable for the welding process.

11. The method of claim 9, wherein the relatively low current and high voltage is suitable for the cutting process.

12. The method of claim 11, wherein the cutting process is a plasma cutting process.

13. The method of claim 9, wherein the relatively low current and high voltage is suitable for a gouging process.

14. The method of claim 9, further comprising passing the output of the main transformer through a single output diode module.

15. The method of claim 9, further including providing a user interface in communication with the control board and receiving an indication via the user interface that a user has selected the welding process or the cutting process.

16. The method of claim 15, further comprising, in response to receiving the indication that a user has selected the welding process or the cutting process, configuring the first switch to be in the first configuration or the second configuration, respectively.

* * * * *